United States Patent
Shemesh et al.

(10) Patent No.: US 11,961,221 B2
(45) Date of Patent: Apr. 16, 2024

(54) DEFECT EXAMINATION ON A SEMICONDUCTOR SPECIMEN

(71) Applicant: Applied Materials Israel Ltd., Rehovot (IL)

(72) Inventors: Dror Shemesh, Hod Hasharon (IL); Miriam Brook, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 106 days.

(21) Appl. No.: 17/496,616

(22) Filed: Oct. 7, 2021

(65) Prior Publication Data

US 2023/0114624 A1 Apr. 13, 2023

(51) Int. Cl.
*G06T 7/00* (2017.01)
*G01N 21/95* (2006.01)
*G01N 21/88* (2006.01)

(52) U.S. Cl.
CPC ....... *G06T 7/0008* (2013.01); *G01N 21/9501* (2013.01); *G01N 2021/8887* (2013.01); *G06T 2207/20081* (2013.01); *G06T 2207/30148* (2013.01)

(58) Field of Classification Search
CPC ......... G06T 7/0008; G06T 2207/20081; G06T 2207/30148; G06T 7/0004; G06T 2207/20084; G01N 21/9501; G01N 2021/8887

See application file for complete search history.

(56) References Cited

U.S. PATENT DOCUMENTS

| | | | |
|---|---|---|---|
| 2015/0253256 A1* | 9/2015 | Zhou | G01B 11/06 356/237.5 |
| 2016/0109376 A1* | 4/2016 | Pavani | G03F 9/7088 356/237.5 |
| 2017/0193400 A1* | 7/2017 | Bhaskar | G06N 3/08 |
| 2017/0345140 A1* | 11/2017 | Zhang | G06T 7/0004 |
| 2018/0149603 A1* | 5/2018 | Bhattacharyya | G01R 31/311 |
| 2018/0293721 A1* | 10/2018 | Gupta | G01N 21/95607 |
| 2018/0330511 A1* | 11/2018 | Ha | G06F 30/00 |
| 2022/0172347 A1* | 6/2022 | Tukker | G03F 7/70633 |
| 2022/0375051 A1* | 11/2022 | Brauer | G06T 7/001 |

* cited by examiner

*Primary Examiner* — Roy M Punnoose
(74) *Attorney, Agent, or Firm* — Lowenstein Sandler LLP (57) ABSTRACT

There is provided a system and method of runtime defect examination of a semiconductor specimen, comprising obtaining a first image representative of at least part of the semiconductor specimen, the first image acquired by an examination tool configured with a first focus plane; estimating whether the first image is in focus using a machine learning (ML) model, wherein the ML model is previously trained for classifying images into focused images and defocused images; upon an estimation that the first image is out of focus, performing focus calibration on the examination tool to select a second focus plane associated with an optimal focus score; and obtaining a second image acquired by the examination tool configured with the second focus plane, and estimating whether the second image is in focus using the ML model. The second image, upon being estimated as being in focus, is usable for defect examination on the specimen.

20 Claims, 5 Drawing Sheets

DEFECT EXAMINATION ON A SEMICONDUCTOR SPECIMEN

TECHNICAL FIELD

The presently disclosed subject matter relates, in general, to the field of examination of a semiconductor specimen, and more specifically, to focus calibration for examination of the semiconductor specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be increased by automatization of process(es) as, for example, defect detection, Automatic Defect Classification (ADC), Automatic Defect Review (ADR), automated metrology-related operations, etc.

The examination processes are generally performed on the output images acquired by the examination tools. Images with degraded quality in various aspects, such as defocused images, when being used for examination of the semiconductor specimen, may impact the examination results.

SUMMARY

In accordance with certain aspects of the presently disclosed subject matter, there is provided a computerized system of runtime defect examination on a semiconductor specimen, the system comprising a processing and memory circuitry (PMC) configured to: obtain a first image representative of at least part of the semiconductor specimen, the first image acquired by an examination tool configured with a first focus plane; estimate whether the first image is in focus using a machine learning (ML) model, wherein the ML model is previously trained for classifying images into focused images and defocused images; upon an estimation that the first image is out of focus, perform focus calibration on the examination tool so as to select a second focus plane associated with an optimal focus score; and obtain a second image acquired by the examination tool configured with the second focus plane and estimate whether the second image is in focus using the ML model, wherein the second image, upon being estimated in focus, is usable for defect examination on the specimen.

In addition to the above features, the system according to this aspect of the presently disclosed subject matter can comprise one or more of features (i) to (ix) listed below, in any desired combination or permutation which is technically possible:

(i). The examination tool is an electron beam tool.
(ii). The ML model is a binary classifier which is previously trained using a training dataset including a subset of focused images and a subset of defocused images each associated with a corresponding ground truth label.
(iii). The training dataset is obtained by collecting, for each specimen of one or more specimens having respective design patterns, a set of images of the specimen scanned under different focus plane configurations of the examination tool, and providing ground truth labels respectively associated with the set of images.
(iv). The ground truth labels are provided by applying a focus threshold to the set of images. The focus threshold is determined based on a focus sensitivity requirement with respect to a specific examination application.
(v). One or more defocused images in the subset of defocused images are artificially generated based on an image pattern indicated in a corresponding focused image in the subset of focused images using a generative adversarial network (GAN).
(vi). The focus calibration is performed by adjusting a focus plane of the examination tool along a focus axis to a plurality of focus points along a focus axis; acquiring a plurality of images corresponding to the plurality of focus points; calculating a focus score for each of the plurality of images, giving rise to a plurality of focus scores; selecting, from the plurality of images, an image with an optimal focus score among the plurality of images among the plurality of focus scores; and configuring the examination tool with a second focus plane associated with the selected image.
(vii). The focus plane is adjusted by mechanically moving a placement stage of the semiconductor specimen or electrically changing a landing energy of an electron beam of the examination tool.
(viii). Upon an estimation that the second image is out of focus, the PMC is further configured to perform focus calibration on the examination tool to select a third focus plane associated with an optimal focus score, obtain a third image acquired by the examination tool configured with the third focus plane, and estimate whether the third image is in focus.
(ix). Upon an estimation that the first image is in focus, the PMC is further configured to determine to use the first image for defect examination on the specimen.

In accordance with other aspects of the presently disclosed subject matter, there is provided a method of runtime defect examination on a semiconductor specimen, the method performed by a processing and memory circuitry (PMC) and comprising: obtaining a first image representative of at least part of the semiconductor specimen, the first image acquired by an examination tool configured with a first focus plane; estimating whether the first image is in focus using a machine learning (ML) model, wherein the ML model is previously trained for classifying images into focused images and defocused images; upon an estimation that the first image is out of focus, performing focus calibration on the examination tool so as to select a second focus plane associated with an optimal focus score; and obtaining a second image acquired by the examination tool configured with the second focus plane and estimating whether the second image is in focus using the ML model, wherein the second image, upon being estimated in focus, is usable for defect examination on the specimen.

This aspect of the disclosed subject matter can comprise one or more of features (i) to (ix) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of runtime defect examination on a semiconductor specimen, the method comprising: obtaining a first image representative of at least part of the semiconductor specimen, the first image acquired by an examination tool configured with a first focus plane; estimating whether the first image is in focus using a machine learning (ML) model, wherein the ML model is previously trained for classifying images into focused images and defocused images; upon an estimation that the first image is out of focus, performing focus calibration on the examination tool so as to select a second focus plane associated with an optimal focus score; and obtaining a second image acquired by the examination tool configured with the second focus plane and estimating whether the second image is in focus using the ML model, wherein the second image, upon being estimated in focus, is usable for defect examination on the specimen.

This aspect of the disclosed subject matter can comprise one or more of features (i) to (ix) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "examining", "obtaining", "estimating", "determining", "acquiring", "performing", "calibrating", "training", "collecting", "providing", "applying", "generating", "adjusting", "acquiring", "calculating", "selecting", "configuring", "moving", "changing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the focus estimation and calibration system and respective parts thereof disclosed in the present application.

The term "examination" used in this specification should be expansively construed to cover any kind of operations related to detection and/or classification of defects, as well as metrology operations in a specimen during its fabrication. Examination is provided by using non-destructive examination tools during or after manufacture of the specimen to be examined. By way of non-limiting example, the examination process can include one or more of the following operations: runtime scanning (in a single or in multiple scans), sampling, reviewing, measuring, classifying and/or other operations provided with regard to the specimen or parts thereof, using the same or different examination tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

The term "metrology operation" used in this specification should be expansively construed to cover any metrology operation procedure used to extract metrology information relating to one or more structural elements on a semiconductor specimen. By way of example, metrology information to be extracted can be indicative of one or more of the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. In some embodiments, the metrology operations can include measurement operations, such as, e.g., critical dimension (CD) measurements performed with respect to certain structures on the specimen. Measurement results such as measured images are analyzed for example, by employing image-processing techniques. Note that, unless specifically stated otherwise, the term "metrology" or derivatives thereof used in this specification are not limited with respect to measurement technology, measurement resolution, or size of inspection area.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on or within a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
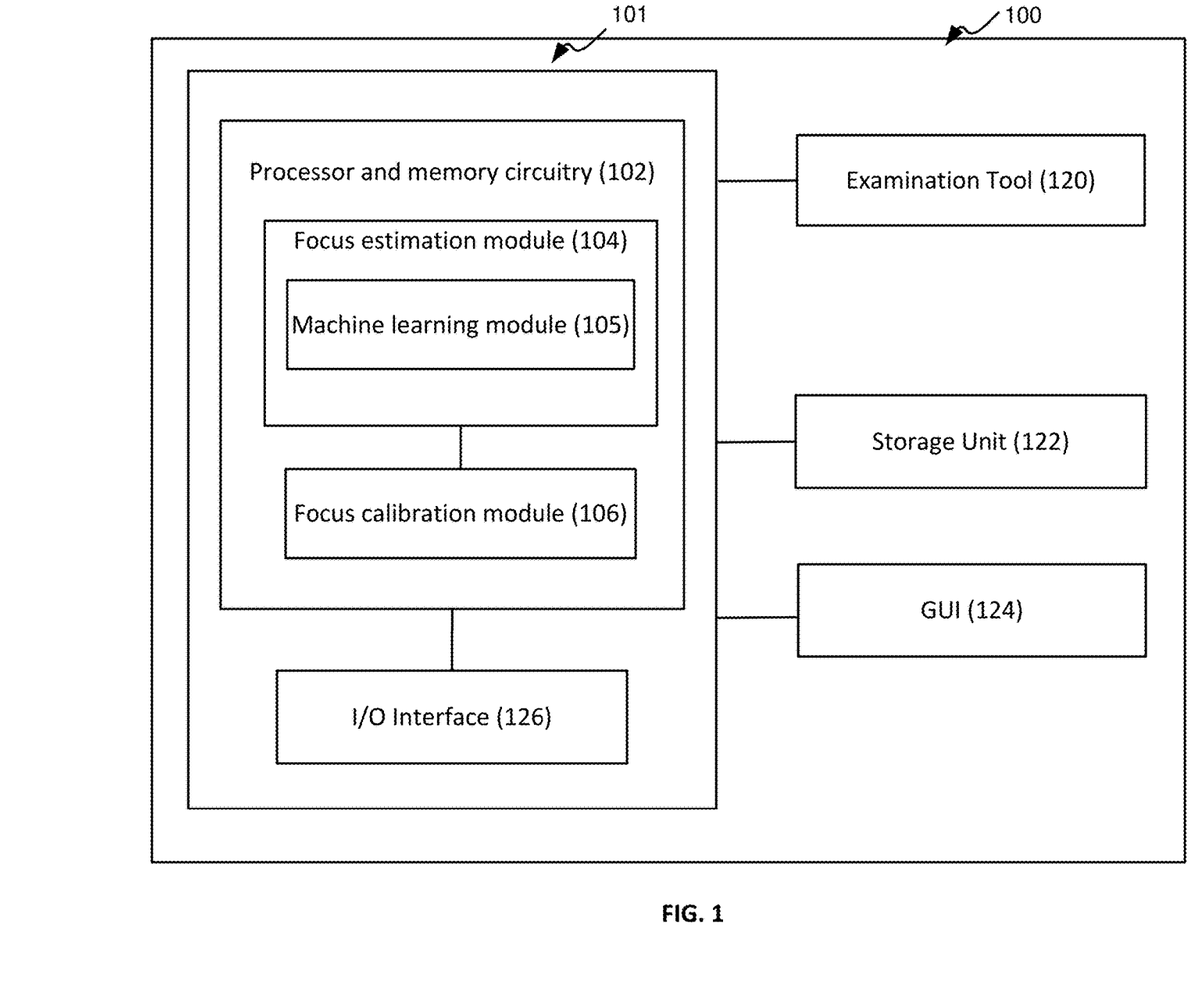
FIG. 1 illustrates a generalized block diagram of an examination system in accordance with certain embodiments of the presently disclosed subject matter.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., of a wafer and/or parts thereof) as part of the specimen fabrication process. According to certain embodiments of the presently disclosed subject matter, the illustrated examination system 100 comprises a computer-based system 101 capable of performing focus estimation and calibration of an examination tool so as to obtain images of the specimen at optimal focuses during image acquisition in runtime specimen examination. The images acquired with optimal focuses are usable for examination of the semiconductor specimen, such as, e.g., defect inspection and detection, and defect review and/or classification, etc. System 101 is also referred to herein as a focus estimation and calibration system.

As described above, the examination referred to herein can be construed to cover any kind of defect related operations as well as metrology operations in a specimen during or after its fabrication. By way of example, the acquired images can be used for examination such as, e.g., defect inspection and detection, and/or Automatic Defect Review (ADR), and/or Automatic Defect Classification (ADC), and/or metrology-related operations, such as, e.g., critical dimension (CD) measurements with respect to a specimen or parts thereof.

By way of example, in some embodiments, during defect inspection and detection, the specimen can move at a step size relative to the microscope of an examination tool (or the specimen and the tool can move in opposite directions relative to each other), and the specimen can be scanned step-by-step by the tool which images only a part/portion of the specimen (referred to as field of view (FOV)) at a time. For instance, at each step, signals can be detected from a rectangular FOV of the specimen and such detected signals are converted into multiple intensity values at multiple points in the FOV, thereby forming an image corresponding to the FOV of the specimen. Therefore, a plurality of images of the specimen can be sequentially obtained during the sequential scanning of the specimen, each representative of a respective part/portion (FOV) of the specimen.

During the sequential scanning and image acquisition, each FOV should be in focus in order to acquire an image at optimal focus which provides sufficient quality and resolution for examination of the specimen. System 101 is designed and configured to examine the focus of each FOV during scanning, and trigger a focus calibration process when it is found that an image is out of focus, as detailed below.

System 101 can be operatively connected to one or more examination tools 120 configured to scan a semiconductor specimen and capture images thereof for examination of the specimen.

The term "examination tool(s)" used herein should be expansively construed to cover any tools that can be used in examination-related processes, including, by way of non-limiting example, imaging, scanning (in a single or in multiple scans), sampling, reviewing, measuring, classifying and/or other processes provided with regard to the specimen or parts thereof.

In some embodiments, the one or more examination tools 120 can include one or more inspection tools and/or one or more review tools. In some cases, at least one of the examination tools 120 can be an inspection tool (e.g., an optical inspection tool, a Scanning Electron Microscope (SEM), etc.) configured to scan a specimen (e.g., an entire wafer, an entire die or portions thereof) to capture inspection images for detection of potential defects on the specimen. In some cases, at least one of the examination tools 120 can be a review tool, which is configured to capture review images of at least some of the defects detected by inspection tools for ascertaining whether a potential defect is indeed a defect. Such a review tool (e.g., a relatively high-resolution Scanning Electron Microscope (SEM)) is usually configured to inspect fragments of a die, one at a time (typically, at relatively low-speed and/or high-resolution). In some cases, the review tool can have defect classification capabilities. Inspection tool and review tool can be different tools located at the same or at different locations, or a single tool operated in two different modes. In some cases, at least one examination tool can have metrology capabilities, such as, e.g., critical dimension scanning electron microscopes (CD-SEM) used to measure critical dimensions of structural features in the images.

The resulting image data (either low-resolution image data or high-resolution image data) can be transmitted—directly or via one or more intermediate systems—to system 101. In some cases, the same examination tool can provide low-resolution image data and high-resolution image data.

According to certain embodiments, one of the examination tools is an electron beam tool, such as, e.g., Scanning Electron Microscopy (SEM). SEM is a type of electron microscope that produces images of a specimen by scanning the surface with a focused beam of electrons. The electrons interact with atoms in the specimen, producing various signals that contain information of the surface of the specimen. The position of the beam is combined with the intensity of the detected signal to produce an image. SEM is capable of accurately detecting and measuring features during the manufacture of semiconductor wafers.

Image acquisition for specimen examination is usually preferred to be performed at an optimal focus that produces the highest contrast of an image pattern (i.e., a pattern of the specimen that is imaged). The point of optimal focus can be found by executing a focus calibration during which the examination tool scans through different focal planes ("focus ramp"), calculates a focus score for each image at the different focal planes, and finds the focal plane that has the maximal score. However, once the focus is found for a current scan, maintaining the acquired images to be in-focus over long time span of examination and on varying patterns is an essential and nontrivial task, due to various reasons, among which a few are exemplified below.

First, as the examination tool continues to navigate and acquire images at different locations on the wafer, certain physical factors, such as, e.g., the relative distance between the wafer placement stage and the detector, wafer orientation, etc., may vary between different scans, thus causing defocusing issues.

Second, with respect to image acquisition performed by a high-resolution SEM, additional physical effects occurring during the scanning, such as charging effects, may arise, thus causing the rate of defocusing to increase and making the task of maintaining the acquired images in focus to become even more challenging.

Specifically, semiconductor specimens collect charges when scanned by the electron beam, and the buildup of surface charges on a specimen caused by the electron beam may affect the focus of the acquired image. This is because when charging occurs, some electrons may be buried inside the specimen, creating a surface potential which is different from the potential of the neighboring locations. This potential can influence the energy of the incident beam, and therefore change the focus. When the acquired image is not in its optimal focus, the image becomes blurred and the resolution deteriorates, which has a negative impact on defect detection of advanced semiconductor processes. Such defocus effect can lead to an increasing inability to accurately detect and classify defects, as well as measure critical integrated device dimensions in the semiconductor industry. These inaccuracies can pose a significant problem in the manufacture of integrated circuits.

In addition, the calculation of the focus score strongly depends on the image pattern. In other words, the focus score calculated on one pattern cannot be used as an indicator of the focal plane to be used for capturing an image with a different pattern. Therefore, the focus ramp must be executed for every different pattern.

Different measures for addressing these issues were utilized. One attempt to maintain in focus is to apply a real-time focus tracking module (all-time continuous focus tracking) in the examination tool. However, the implementation of such a module is complicated, requiring dedicated hardware and significant system modifications in order to integrate it into the image acquisition process.

An alternative approach is to trigger periodic focus calibration for every N images to be acquired, where N is a predetermined integer within a range. Such an approach may be time consuming as the multiple calibrations will inevitably increase the scan duration by a significant factor, thus affecting the throughput (TpT) of the examination. An additional disadvantage resides in the uncertainty of selecting the correct value for N, resulting in the incapability to ensure the acquired images all being in-focus.

According to certain embodiments of the presently disclosed subject matter, there is proposed a novel approach to accurately determine, for each acquired image during runtime examination, whether to trigger focus calibration based on a machine learning model which is pre-trained to estimate whether the acquired image is in focus or not. In particular, according to some embodiments, the proposed method and system can be applied to a defect inspection and detection application using an electron beam tool, such as SEM.

As illustrated in FIG. 1, system 101 includes a processor and memory circuitry (PMC) 102 operatively connected to a hardware-based I/O interface 126. PMC 102 is configured to provide processing necessary for operating the system as further detailed with reference to FIGS. 2, 3 and 4, and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, or a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

According to certain embodiments, functional modules comprised in PMC 102 can include a focus estimation module 104 and a focus calibration module 106. The focus estimation module 104 can include a machine learning model 105. The PMC 102 can be configured to obtain, via I/O interface 126, a first image representative of at least part of the semiconductor specimen. The first image can be acquired by an examination tool 120 (e.g., a SEM tool) configured with a first focal plane. The focus estimation module 104 can be configured to estimate whether the first image is in focus or is not using the machine learning (ML) model 105. The ML model 105 is previously trained for classifying images into focused images and defocused images.

Upon an estimation (by the focus estimation module 104) that the first image is out of focus, the focus calibration module 106 can be configured to perform focus calibration on the examination tool so as to select a second focal plane associated with an optimal focus score.

The PMC 102 can be configured to obtain, via the I/O interface 126, a second image acquired by the examination tool 120 configured with the second focal plane, and the focus estimation module 104 can be configured to estimate whether the second image is in focus using the ML model. The second image, upon being estimated in focus, is usable for examination of the semiconductor specimen, as described above.

Operations of system 101, PMC 102 and the functional modules therein, will be further detailed with reference to FIGS. 2, 3 and 4.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store the images produced by the examination tool 120 and/or derivatives thereof. Accordingly, the images can be retrieved from the storage unit 122 and provided to the PMC 102 for further processing. In some cases, the storage unit 122 can be configured to store the training data set used to train the machine learning model. Optionally, the storage unit 122 can also store the primitive ML model before being trained and/or the trained ML model.

In some embodiments, system 101 can optionally comprise a computer-based Graphical User Interface (GUI) 124 which is configured to enable user-specified inputs related to system 101. For instance, the user can be presented with a visual representation of the specimen (for example, by a display forming part of GUI 124), including acquired images of the specimen. The user may be provided, through the GUI, with options of defining certain operation parameters, such as, e.g., a focus sensitivity requirement, and/or a focus threshold. In some cases, the user may also view operation results, such as the images estimated as being in focus or defocused, and/or further examination results (e.g., detection results and/or review results and/or measurements on the focused images) on the GUI.

As described above, system 101 is configured to receive, via I/O interface 126, one or more images of the specimen. The images can include image data (and/or derivatives thereof) produced by the examination tools 120 and/or image data stored in the storage unit 122 or one or more data depositories. In some cases, image data can refer to images captured by the examination tools during the fabrication process, and/or pre-processed images derived from the captured images as obtained by various pre-processing stages, etc. It is noted that in some cases the images can include associated numeric data (e.g., metadata, hand-crafted attributes, etc.). It is further noted that the image data can include data related to a layer of interest in the specimen and/or data related to multiple layers of the specimen.

System 101 is further configured to process the received images and send, via I/O interface 126, the results or part thereof (e.g., the images estimated as being in focus, and/or further examination results) to the storage unit 122, and/or the examination tool 120.

In some embodiments, additionally to the examination tool 120, the examination system 100 can comprise one or more examination modules, such as, e.g., defect inspection and detection module, and/or Automatic Defect Review Module (ADR), and/or Automatic Defect Classification Module (ADC), and/or a metrology-related module, and/or other examination modules which are usable for examination of a semiconductor specimen. The one or more examination modules can be implemented as stand-alone computers, or their functionalities (or at least some thereof) can be integrated with the examination tool 120. In some embodiments, the images as obtained from system 101 can be used by the examination tool 120 and/or the one or more examination modules (or part thereof) for further examination of the specimen.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the examination system illustrated in FIG. 1 can be implemented in a distributed computing environment, in which the aforementioned functional modules as well as comprised in the PMC 102 can be distributed over several local and/or remote devices, and can be linked through a communication network. It is further noted that in other embodiments at least some of the examination tool(s) 120, storage unit 122 and/or GUI 124 can be external to the examination system 100 and operate in data communication with system 101 via I/O interface 126. System 101 can be implemented as stand-alone computer(s) to be used in conjunction with the examination tools. Alternatively, the respective functions of the system 101 can, at least partly, be integrated with one or more examination tools 120, thereby facilitating and enhancing the functionalities of the examination tools 120 in examination-related processes.

Figure 2:
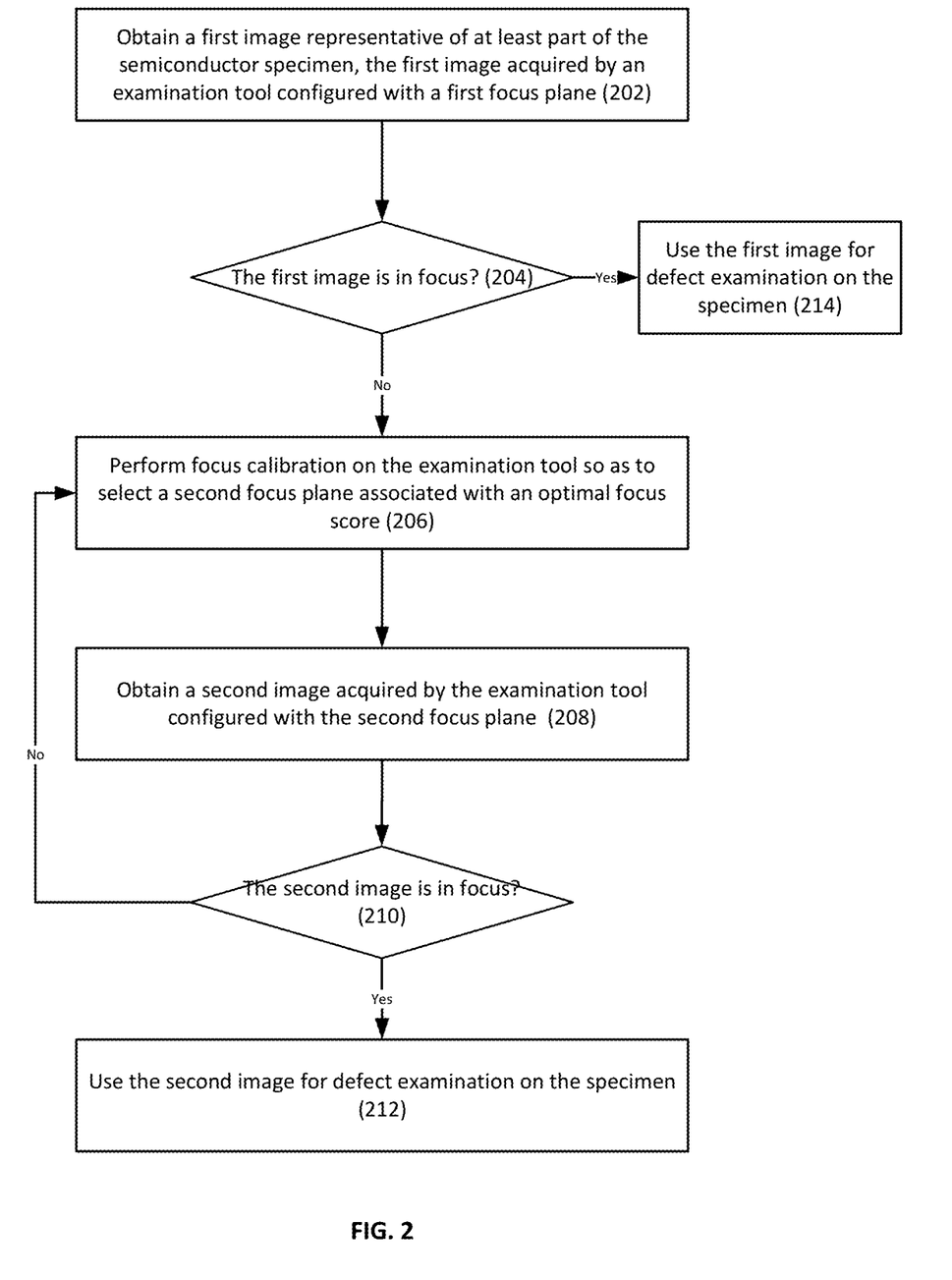
FIG. 2 illustrates a generalized flowchart of runtime defect examination on a semiconductor specimen in accordance with certain embodiments of the presently disclosed subject matter.
Figure 3:
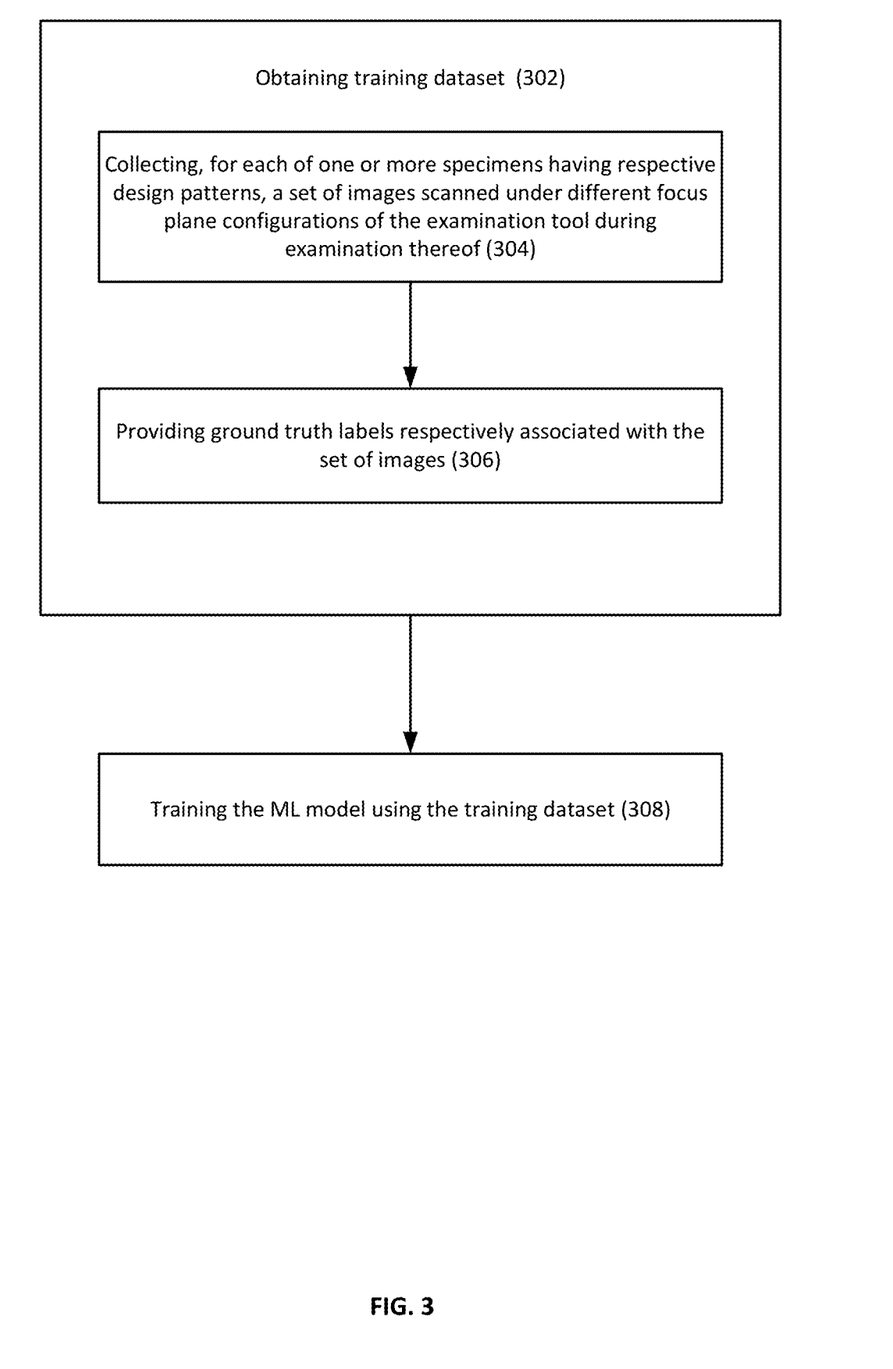
FIG. 3 illustrates a generalized flowchart of training the ML model in accordance with certain embodiments of the presently disclosed subject matter.
Figure 4:
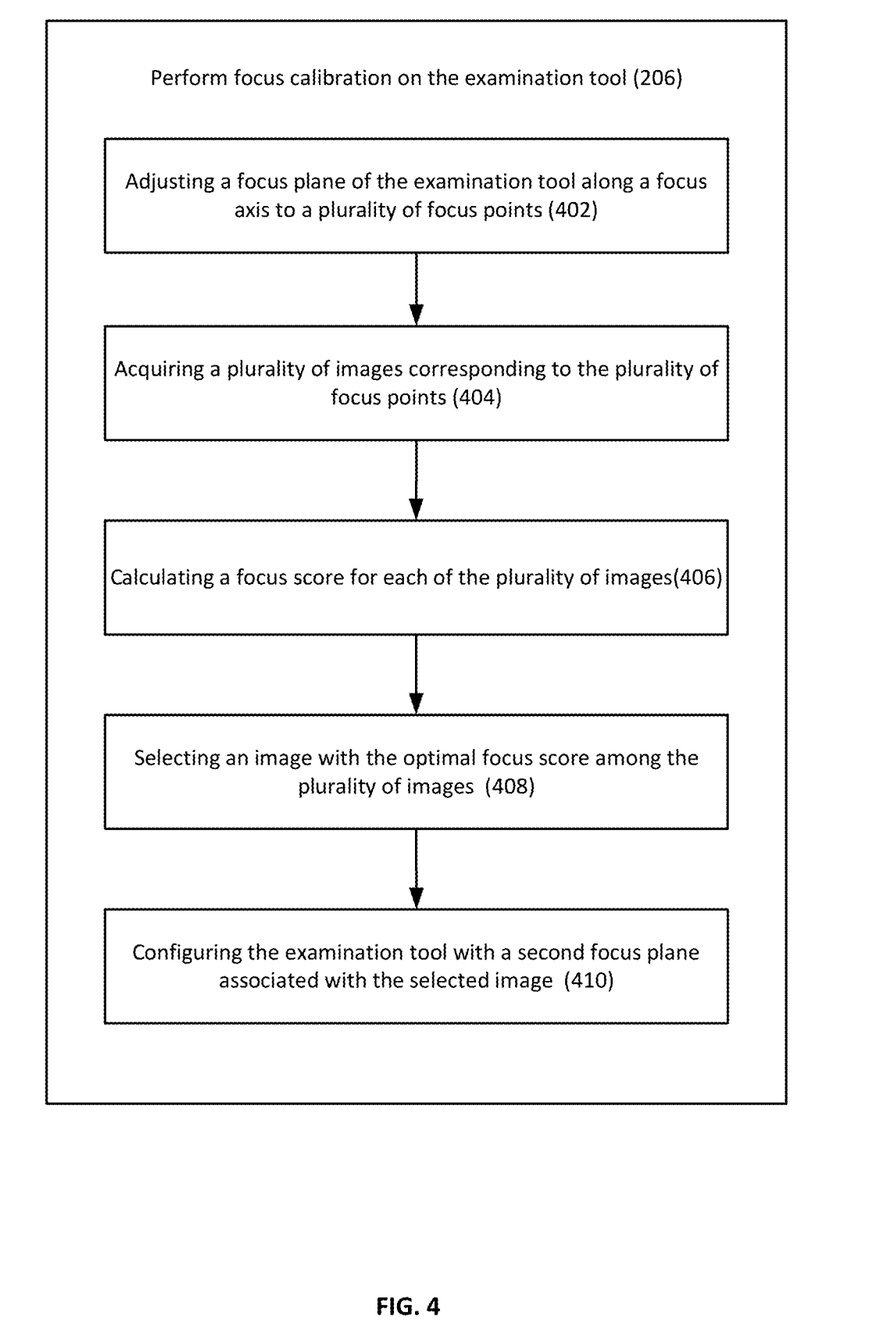
FIG. 4 illustrates a generalized flowchart of focus calibration in accordance with certain embodiments of the presently disclosed subject matter.

While not necessarily so, the process of operation of systems 101 and 100 can correspond to some or all of the stages of the methods described with respect to FIGS. 2-4. Likewise, the methods described with respect to FIGS. 2-4 and their possible implementations can be implemented by systems 101 and 100. It is therefore noted that embodiments discussed in relation to the methods described with respect to FIGS. 2-4 can also be implemented, mutatis mutandis as various embodiments of the systems 101 and 100, and vice versa.

Referring now to FIG. 2, there is illustrated a generalized flowchart of runtime defect examination on a semiconductor specimen in accordance with certain embodiments of the presently disclosed subject matter.

A first image representative of at least part of the semiconductor specimen can be obtained (202) (e.g., by the PMC 102 via I/O interface 126). The first image can be acquired by an examination tool (e.g., by the examination tool 120) configured with a first focal plane. By way of example, the first image can be acquired by an electron beam tool, such as a SEM tool, during runtime examination of the semiconductor specimen. It is to be noted that the term "runtime" or "runtime examination" used herein refers to the production phase of the actual on-line examination of a semiconductor specimen during its fabrication process in the FAB, in contrast to a recipe setup phase or a testing phase or a training phase, which is an off-line setup stage in preparation for the runtime examination.

It is also to be noted that the term "first" as used throughout the specification does not necessarily mean the very first item, e.g., the very first image as captured by the examination tool, or the very first focal plane as configured; rather it is used to distinguish from a "second" or "third" (a different) item. For instance, the first image is an image that is different from the second or third image, and the first focal place is a focal plane that is different from a second or third focal plane.

A focal plane (also termed as the plane of focus, or a focus plane) refers to a plane that is perpendicular to the axis of a lens and passes through the focal point. The focal plane can provide the optimal (sharpest) focus at a particular depth of field. The distance of the focal plane from the lens is equal to the focal length of the lens.

The first focal plane refers to a present focal plane as set in the current configuration of the examination tool prior to capturing the first image (e.g., either as a focal plane used in the acquisition of a previous image at a previous location of the specimen, or as a focal plane as initially configured in the tool, in cases where the first image is actually the very first image that the tool captures when the examination starts).

As described above, it is recognized in the art that it is challenging to maintain the images acquired by an examination tool to be in-focus over a long time span of examination and on varying patterns, due to various reasons, such as, e.g., the focus score being pattern-dependent, the charging effects built up on the tool, relative physical position variations, etc. Therefore, continuing with the description of block 202, even if the first focal plane is indeed the optimal focus for capturing the previous image at a previous location on the specimen, there is no guarantee that the first image captured for a present location using the same focal plane will still be in focus.

An image pattern, or a design pattern used herein can correspond to any original object or any combination of one or more original objects on the specimen that has a geometrical shape or geometrical structure with a contour, therefore forming a pattern. Examples of a pattern can include general shape features/objects, including, such as, e.g., contacts, lines, etc., and/or any composite shape formed by a combination of the general shape features.

Certain embodiments of the presently disclosed subject matter propose an on-line focus estimation and calibration method by accurately determining, with respect to each acquired image during runtime examination, whether to trigger focus calibration based on a machine learning model which is pre-trained to estimate if the acquired image is in focus or not.

The proposed method ensures that the focus calibration is performed only when actually needed, thus does not significantly increase the scan duration, or does not affect the throughput (TpT) of the examination. The method is easy to implement and does not require dedicated hardware or significant system modifications for integration with the current image acquisition process. In addition, the method can ensure the images are all acquired at optimal focus planes, thus guaranteeing the focus quality of the acquired images.

Specifically, it is estimated (204) (e.g., by the focus estimation module 104 as comprised in the PMC 102) whether the first image is in focus using a machine learning (ML) model (e.g., the ML module 105 as comprised in the focus estimation module 104). The ML model is previously trained for classifying images into focused images (also referred to as in-focus images) and defocused images (also referred to as out-of-focus images).

According to certain embodiments, the ML model 106 referred to herein can be implemented as various types of machine learning models, such as, e.g., a decision tree, a Support Vector Machine (SVM), a regression model, a neural network, or ensembles/combinations thereof etc. The learning algorithm used by the ML model can be any of the following: supervised learning, unsupervised learning, or semi-supervised learning, etc. The presently disclosed subject matter is not limited to the specific type of ML model or the specific type or learning algorithm used by the ML model.

In some embodiments, the ML model 106 can be implemented as a deep neural network (DNN) which includes layers organized in accordance with respective DNN architectures. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. There is now described an exemplified implementation of a DNN usable for employment of the ML model.

Each layer of the DNN can include multiple basic computational elements (CE) typically referred to in the art as dimensions, neurons, or nodes. Generally, CEs of a given layer can be connected with CEs of a preceding layer and/or a subsequent layer. Each connection between the CE of a preceding layer and the CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The ML model (e.g., the DNN) has a set of model parameters (such as, e.g., the weighting and/or threshold values of the DNN) that are optimized during the training phase. A set of DNN input data used to adjust the model parameters of the DNN is referred to hereinafter as a training set, or training dataset, or training data. The training of the ML model can be previously performed by a training engine during the training phase, as will be detailed below with reference to FIG. 3.

Turning now to FIG. 3, there is illustrated a generalized flowchart of training the ML model in accordance with certain embodiments of the presently disclosed subject matter.

In some embodiments, the ML model can be implemented as a binary classifier, and a training dataset including a subset of focused images and a subset of defocused images each associated with a corresponding ground truth label can be obtained (302) and used to train the binary classifier. The training of the ML model can be performed by a training engine, which in some cases can be implemented as part of system 101 (e.g., as a training module comprised in PMC 102), or as part of system 100 (e.g., as a training unit comprised in system 100 and operatively connected to system 101) in FIG. 1. Alternatively, in some other cases it can be implemented as a separate training system in a separate computer, which may (or may not) be in wired or wireless communication with system 100.

According to certain embodiments, the training dataset can be obtained by collecting (304), for each specimen of one or more semiconductor specimens having respective design patterns, a set of images of the specimen scanned under different focus plane configurations of the examination tool, and providing (306) ground truth labels associated with the set of images.

Figure 5:
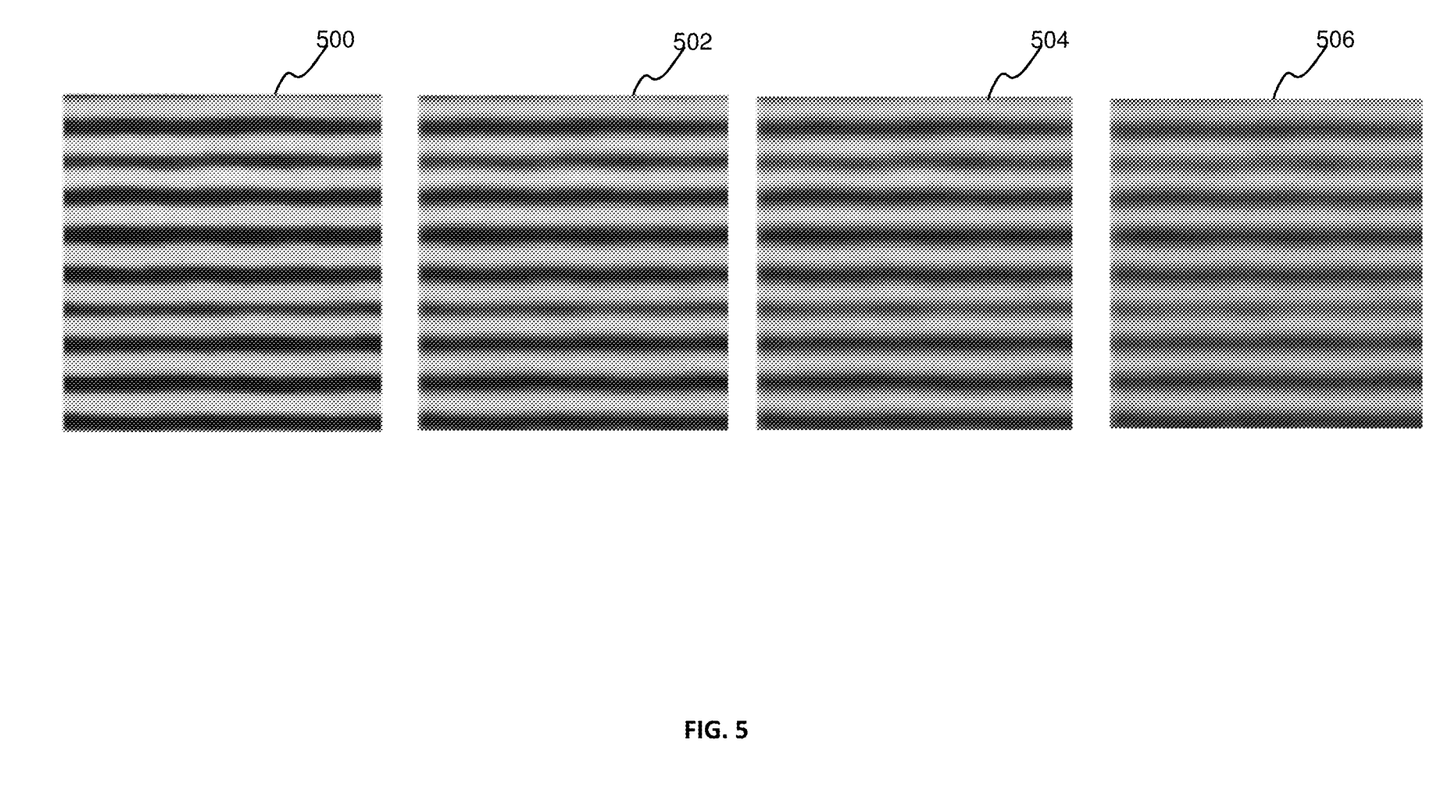
FIG. 5 illustrates an example of a set of images scanned under different focus plane configurations in accordance with certain embodiments of the presently disclosed subject matter.

FIG. 5 illustrates an example of a set of images scanned under different focus plane configurations in accordance with certain embodiments of the presently disclosed subject matter. As shown, image 500 is labeled as a focused image, while images 502, 504 and 506 are labeled as corresponding defocused images with respective defocus degrees.

As described above, in the present exemplified embodiments in FIG. 3, the ML model can be implemented as a binary classifier. Therefore, it is of interest to identify which images in the image set are considered to be out of focus, while which ones are considered to be in focus, rather than determining the absolute degree of focus of each image in the set. Accordingly, it is needed to determine a focus threshold which can be used to distinguish the out of focus images from the in-focus images. By way of example, the focus threshold can be applied to the set of images so as to provide the ground truth labels (e.g., focused, or defocused) associated with the images.

In some embodiments, the focus threshold can be determined based on a focus sensitivity requirement. A focus sensitivity refers to the sensitivity to trigger the focus calibration process as described below with respect to block 206. The focus sensitivity requirement can be predetermined by the customer and/or the application engineer with respect to a specific examination application (e.g., defect detection, or defect review, of a specific specimen, etc.). By way of example, the focus sensitivity requirement can be determined as 10% of resolution loss with respect to the focused image for a defect detection application.

In order to meet the predefined focus sensitivity requirement, the focus threshold has to be determined accordingly so as to be able to correctly identify the out-of-focus images and the in-focus images. However, there are various affecting factors, such as, e.g., different image patterns and/or SEM working points, etc., which may result in different focus thresholds corresponding to the predefined focus sensitivity requirement.

By way of example, as described above, the calculation of a focus score for an image strongly depends on the image pattern. Therefore, focus scores calculated for different patterns indicative of the same degree of focus may vary, which necessarily causes the focus threshold to also vary.

By way of another example, a SEM working point can be defined with respect to at least one of the following working parameters: electron beam energy, beam current, extraction voltage, etc. Different working points may affect the depth of focus of the examination tool, which will in turn impact the focus threshold.

Therefore, the same focus sensitivity requirement (e.g., 10% of resolution loss) may result in different focus thresholds corresponding to different image patterns and/or different working points. Accordingly, the focus threshold pertaining to a given specimen with specific design pattern (for which a set of images are obtained as described above with reference to block 304) can be calculated based on the focus sensitivity requirement while taking into consideration the affecting factors, such as, e.g., the SEM working points, etc., as described above.

Once the focus threshold is derived, it can be applied to the set of images obtained for the given specimen, e.g., by comparing the focus scores of the images in the set with the focus threshold. By way of example, assume the focus score is normalized and the score of 1 represents an image with an optimal focus. The images having the focus scores below the focus threshold can be labeled with the ground truth label of defocused (or out of focus), while the images having the focus scores above (or equal to) the focus threshold can be labeled with the ground truth label of focused (or in focus). By way of another example, if the focus score is defined otherwise, e.g., a smaller score indicates a better focus degree, then the images having the focus scores above (or equal to) the focus threshold can be labeled with the ground truth label of defocused (or out of focus), while the images having the focus scores below the focus threshold can be labeled with the ground truth label of focused (or in focus).

The present disclosure is not limited to a specific way of applying the focus threshold to the focus scores of the images.

According to certain embodiments, the focus score for an image can be calculated using different focus measures assessing the degree of sharpness, or degree of focus of an image, and the present disclosure is not limited to a specific focus score calculation. By way of example, gradient-based focus measure, which is based on the gradient or approximations of the first derivatives of the image, can be used for calculating the focus score. This focus measure follows the assumption that focused images present sharper edges than blurred ones. Thus, the energy of the gradient can be exploited in order to estimate the degree of focus. Similarly, a Laplacian-based focus measure, which is based on the second derivative of the image, can also be used. By way of another example, a statistics-based focus measure, which is based on text descriptors of the image, can be used. This focus measure follows the assumption that a defocused image can be interpreted as a texture whose smoothness increases for increasing levels of defocus.

It is to be noted that the focus measures as described above are illustrated for exemplary purposes only, and should not be regarded as limiting the present disclosure in any way. Other suitable focus measures, such as, e.g., wavelet-based focus measure, or a focus measure based on image contrast, can be used in addition to or in lieu of the above.

The training dataset as obtained with reference to block 302 can be used (308) to train the ML model. By way of example, the initial values of the model parameters of a ML model (e.g., a DNN) can be selected prior to training, and can be further iteratively adjusted or modified during training to achieve an optimal set of weighting and/or threshold values in a trained DNN. After each iteration, a difference can be determined between the actual output produced by DNN and the target output associated with the respective training set of data. The difference can be referred to as an error value. Training can be determined to be complete when a cost function indicative of the error value is less than a predetermined value, or when a limited change in performance between iterations is achieved.

In some cases, the above training data collection process as described with respect to blocks 304 and 306 can be performed as an off-line process in the training phase. In order to meet a relatively high focus sensitivity, the ML model should be trained on a training dataset including as many image patterns and structures as possible, at different focus planes. To collect training data off-line with such a wide variety can be very time consuming. Moreover, grabbing multiple images with different focus configurations at the same location of a specimen by the SEM tool might cause certain physical effects (such as, e.g., burn marks) on the specimen, thus impacting the content of the captured image.

In order to address the above training data collection issue, a universal training dataset can be initially created, which can be enriched every time a new specimen (i.e., a fabricated specimen to be examined) is scanned during its on-line runtime examination. Specifically, such scans can be incorporated into the on-line focus calibration process (as will be described below with respect to block 206 of FIG. 2) which takes place before the actual examination. The specimen will be scanned at different focus configurations and the scanned images can be manually labelled and added into the training dataset. In such way, the training dataset can be enriched during both off-line and on-line processes, and the ML model can be kept updated on an on-going basis based on the continuously enriched training dataset (e.g., by continuously retraining the ML model using the enriched training dataset).

According to certain embodiments, additionally or alternatively to the online data collection process as described above, data augmentation can be used to address the problem of insufficient training dataset size and diversity. By way of example, data augmentation can be used to generate the defocused images artificially, e.g., by learning the defocus properties and its effect on image quality. In one embodiment, one or more defocused images in the subset of defocused images are artificially generated based on an image pattern indicated in a corresponding focused image in the subset of focused images using a generative adversarial network (GAN).

GAN refers to a neural network system that is composed of two neural networks contesting with each other in a zero-sum game framework. The generator network G is trained to generate samples/instances by transforming input data into a specific data distribution of interest, while the discriminator network D is trained to discriminate between instances from the true data distribution and instances produced by the generator. The generator network's training objective is to increase the error rate of the discriminator network (i.e., "fool" the discriminator network by producing novel synthesized instances that appear to have come from the true data distribution), and the discriminator network's training objective is to distinguish instances generated from the generator from real data, with accuracy.

According to certain embodiments, the generator network G used in the present disclosure can be trained to generate one or more artificial defocused images based on an image pattern as indicated in a corresponding focused image. By way of example, the input to the generator network G can be a design pattern of the corresponding focused image (e.g., as obtained from the CAD design data of the specimen). By way of another example, the input to the generator network G can be the focused image itself. Optionally, in some cases, a random data vector can be provided to the generator in addition to the image pattern indication, and can be used by the generator to reconstruct and create certain defocus representation to be incorporated/embedded in the reconstructed image of the focused image.

The input to the discriminator network includes the artificial defocused image as generated by the generator and a real defocused image. The discriminator learns to distinguish the artificial defocused image generated by the generator from the real defocused image. The generator and the discriminator can be trained together so as to improve the performance of one another. With the help of the discriminator, the generator can be trained to generate defocused images (with different degrees of focus) that are more real and authentic, at any desired resolution.

Additionally or alternatively, in some cases, data augmentation can also be used to enrich the training dataset by artificially creating images for specimens with different pattern types. This can be performed in a similar manner by using, e.g., GAN.

Continuing with the description of FIG. 2, having described the training process of the ML model used to estimate (204) whether the first image is in focus, there is now described a focus calibration process based on the result of the estimation with respect to block 206.

Specifically, upon an estimation that the first image is out of focus, focus calibration can be performed (206) (e.g., by the focus calibration module 106 as comprised in PMC 102) on the examination tool so as to select a second focus plane associated with an optimal focus score. In other words, the focus calibration process is only triggered when the first image is estimated to be out of focus.

Referring now to FIG. 4, there is illustrated a generalized flowchart of focus calibration in accordance with certain embodiments of the presently disclosed subject matter.

Specifically, the focus plane of the examination tool can be adjusted (402) to a plurality of focus points along a focus axis. By way of example, the focus plane can be adjusted by mechanically moving a placement stage of the semiconductor specimen (e.g., to different heights as relative to the detector of the tool). By way of another example, the focus plane can be adjusted by electrically changing a landing energy of an electron beam of the examination tool (e.g., to different intensities which can result in different degrees of focus in the images).

A plurality of images can be acquired (404) corresponding to the plurality of focus points. A focus score can be calculated (406) for each of the plurality of images, giving rise to a plurality of focus scores corresponding to the plurality of images. As described above, the focus score can be calculated using different focus measures, and the present disclosure is not limited to employment of a specific focus measure. An image with the optimal focus score among the plurality of focus scores can be selected (408) from the plurality of images, and the examination tool can be configured (410) with a second focus plane associated with the selected image, i.e., the focus plane at which the selected image is acquired.

A second image acquired by the examination tool configured with the second focus plane can be obtained (208) (e.g., by the PMC 102 via I/O interface 126) and it can be estimated (210) (e.g., by the focus estimation module 104 as comprised in the PMC 102) whether the second image is in focus, using the ML model. The second image, upon being estimated as in focus, can be used (212) for defect examination (such as defect detection, and/or defect classification) on the specimen.

On the other hand, if the second image is estimated as being out of focus, the process reverts to block 206, and the focus calibration on the examination tool can be performed again (in accordance with the process described with reference to FIG. 4) so as to select a third focus plane associated with an optimal focus score. A third image can be acquired by the examination tool configured with the third focus plane and it can be estimated whether the third image is in focus. In some cases, the process of 206-210 can be repeated until an image acquired by the examination tool is estimated by the ML model as being in focus.

According to certain embodiments, the focus calibration process as described above with reference to FIGS. 2, 3 and 4 can be included as part of an examination recipe usable by system 101 and/or the examination tools 120 for examination of a specimen in runtime, such as, e.g., defect detection, and/or defect classification, etc. In such cases, the presently disclosed subject matter also includes a system and method for generating an examination recipe during a recipe setup phase, where the recipe comprises the steps as described with reference to FIGS. 2, 3 and 4 (and various embodiments thereof). It is to be noted that the term "examination recipe" should be expansively construed to cover any recipe that can be used by an examination tool for performing operations related to any kind of examination as described above.

It is to be noted that examples illustrated in the present disclosure, such as, e.g., the ML model types, the focus measures, the data augmentation techniques, etc., are illustrated for exemplary purposes, and should not be regarded as limiting the present disclosure in any way. Other examples can be used in addition to, or in lieu of the above.

Among advantages of certain embodiments of the presently disclosed subject matter as described herein is to provide an on-line focus estimation and calibration process, which is capable of accurately determining, with respect to each acquired image during runtime examination, whether to trigger focus calibration based on a machine learning model, which is pre-trained to estimate whether the acquired image is in focus or not. Since the focus calibration is triggered only when actually needed, such a process, although performed during the on-line examination process, does not significantly increase the scan duration or affect the throughput (TpT) of the examination.

In addition, the on-line focus estimation and calibration process is easy to implement, and does not require dedicated hardware or significant system modifications for integration with the current image acquisition process.

Among advantages of certain embodiments of the focus estimation and calibration process as described herein is to ensure the output images are all acquired at optimal focus planes, thus guaranteeing the focus quality of the acquired images. The resulting images possess reduced image artifacts with respect to defocusing, which, when used for examination of the semiconductor specimen, such as, e.g., defect examination, can provide better results, with higher accuracy.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system of runtime defect examination on a semiconductor specimen, the system comprising:
a processing and memory circuitry (PMC),
wherein the PMC is configured to perform a method comprising the steps of:
obtaining, by the PMC, a first image representative of at least part of the semiconductor specimen, wherein the first image is acquired by an examination tool configured with a first focus plane;
estimating, by the PMC, using a machine learning (ML) model, whether the first image is in focus, wherein the ML model is previously trained for classifying images into focused images and defocused images;
upon an estimation that the first image is out of focus, performing, by the PMC, focus calibration on the examination tool so as to select a second focus plane associated with an optimal focus score; and
obtaining, by the PMC, a second image acquired by the examination tool configured with the second focus plane, and estimating, by the PMC, using the ML model, whether the second image is in focus, wherein the second image, upon being estimated as being in focus, is used for defect examination on the semiconductor specimen.

2. The computerized system according to claim 1, wherein the examination tool is an electron beam tool.

3. The computerized system according to claim 1, wherein the ML model is a binary classifier which is previously trained using a training dataset including a subset of focused images and a subset of defocused images, each associated with a corresponding ground truth label.

4. The computerized system according to claim 3, wherein the training dataset is obtained by collecting, for each specimen of one or more specimens having respective design patterns, a set of images of the specimen scanned under different focus plane configurations of the examination tool, and providing ground truth labels respectively associated with the set of images.

5. The computerized system according to claim 4, wherein the ground truth labels are provided by applying a focus threshold to the set of images, wherein the focus threshold is determined based on a focus sensitivity requirement with respect to a specific examination application.

6. The computerized system according to claim 3, wherein one or more defocused images in the subset of defocused images are artificially generated based on an image pattern indicated in a corresponding focused image in the subset of focused images using a generative adversarial network (GAN).

7. The computerized system according to claim 1, wherein the focus calibration is performed by:
adjusting a focus plane of the examination tool to a plurality of focus points along a focus axis;
acquiring a plurality of images corresponding to the plurality of focus points;
calculating a focus score for each of the plurality of images, giving rise to a plurality of focus scores;
selecting, from the plurality of images, an image with an optimal focus score among the plurality of focus scores; and
configuring the examination tool with a second focus plane associated with the selected image.

8. The computerized system according to claim 7, wherein the focus plane is adjusted by mechanically moving a placement stage of the semiconductor specimen or electrically changing a landing energy of an electron beam of the examination tool.

9. The computerized system according to claim 1, wherein upon an estimation that the second image is out of focus, the PMC is further configured to perform focus calibration on the examination tool to select a third focus plane associated with an optimal focus score, obtain a third image acquired by the examination tool configured with the third focus plane, and estimate whether the third image is in focus.

10. The computerized system according to claim 1, wherein upon an estimation that the first image is in focus, the PMC is further configured to determine to use the first image for defect examination on the specimen.

11. A computerized method of runtime defect examination on a semiconductor specimen, the method performed by a processing and memory circuitry (PMC), the method comprising:

obtaining a first image representative of at least part of the semiconductor specimen, wherein the first image is acquired by an examination tool configured with a first focus plane;

estimating, using a machine learning (ML) model, whether the first image is in focus, wherein the ML model is previously trained for classifying images into focused images and defocused images;

upon an estimation that the first image is out of focus, performing focus calibration on the examination tool so as to select a second focus plane associated with an optimal focus score; and obtaining a second image acquired by the examination tool configured with the second focus plane, and estimating, using the ML model, whether the second image is in focus, wherein the second image, upon being estimated as being in focus, is used for defect examination on the semiconductor specimen.

12. The computerized method according to claim 11, wherein the examination tool is an electron beam tool.

13. The computerized method according to claim 11, wherein the ML model is a binary classifier which is previously trained using a training dataset including a subset of focused images and a subset of defocused images each associated with a corresponding ground truth label.

14. The computerized method according to claim 13, wherein the training dataset is obtained by collecting, for each specimen of one or more specimens having respective design patterns, a set of images of the specimen scanned under different focus plane configurations of the examination tool, and providing ground truth labels respectively associated with the set of images.

15. The computerized method according to claim 14, wherein the ground truth labels are provided by applying a focus threshold to the set of images, wherein the focus threshold is determined based on a focus sensitivity requirement with respect to a specific examination application.

16. The computerized method according to claim 13, wherein one or more defocused images in the subset of defocused images are artificially generated based on an image pattern indicated in a corresponding focused image in the subset of focused images using a generative adversarial network (GAN).

17. The computerized method according to claim 11, wherein the focus calibration is performed by:

adjusting a focus plane of the examination tool to a plurality of focus points along a focus axis;

acquiring a plurality of images corresponding to the plurality of focus points;

calculating a focus score for each of the plurality of images, giving rise to a plurality of focus scores;

selecting, from the plurality of images, an image with an optimal focus score among the plurality of focus scores; and configuring the examination tool with a second focus plane associated with the selected image.

18. The computerized method according to claim 17, wherein the focus plane is adjusted by mechanically moving a placement stage of the semiconductor specimen or electrically changing a landing energy of an electron beam of the examination tool.

19. The computerized method according to claim 11, further comprising: upon an estimation that the second image is out of focus, performing focus calibration on the examination tool to select a third focus plane associated with an optimal focus score, obtaining a third image acquired by the examination tool configured with the third focus plane, and estimating whether the third image is in focus.

20. A non-transitory computer readable storage medium tangibly embodying a program of instructions that, when executed by a computer, cause the computer to perform a method of runtime defect examination on a semiconductor specimen, the method comprising:

obtaining a first image representative of at least part of the semiconductor specimen, wherein the first image is acquired by an examination tool configured with a first focus plane;

estimating, using a machine learning (ML) model, whether the first image is in focus, wherein the ML model is previously trained for classifying images into focused images and defocused images;

upon an estimation that the first image is out of focus, performing focus calibration on the examination tool so as to select a second focus plane associated with an optimal focus score; and obtaining a second image acquired by the examination tool configured with the second focus plane, and estimating, using the ML model, whether the second image is in focus, wherein the second image, upon being estimated as being in focus, is used for defect examination on the semiconductor specimen.

* * * * *